United States Patent [19]

Miller

[11] 4,454,758

[45] Jun. 19, 1984

[54] VENTURI-TYPE SHUNT FLOWMETER

[76] Inventor: Marion H. Miller, P.O. Box 790, Colorado Springs, Colo. 80901

[21] Appl. No.: 470,248

[22] Filed: Feb. 28, 1983

[51] Int. Cl.³ .......................... G01F 1/44; G01F 5/00
[52] U.S. Cl. .................................... 73/202; 73/861.63
[58] Field of Search ..................... 73/202, 203, 861.63

[56] References Cited

U.S. PATENT DOCUMENTS

| | | | |
|---|---|---|---|
| 535,642 | 3/1895 | Thomson | 73/202 |
| 3,443,434 | 5/1969 | Baker et al. | 73/202 X |
| 3,559,482 | 2/1971 | Baker et al. | 73/202 X |

Primary Examiner—Herbert Goldstein

Attorney, Agent, or Firm—Richard W. Hanes

[57] ABSTRACT

A shunt type fluid flow measuring device for use in measuring the rate of fluid flow in a large conduit, wherein a section of said large conduit includes a reduced diameter portion forming a venturi tube and having a tubular fluid by-pass around a portion of said large conduit wherein the tubular by-pass has a small diameter relative to the large conduit, which is further reduced at a single point in the by-pass flow path, and wherein the outlet terminal of the fluid by-pass connects into the large conduit, and further including a mechanical fluid flow measuring device serially connected into the fluid by-pass.

2 Claims, 3 Drawing Figures

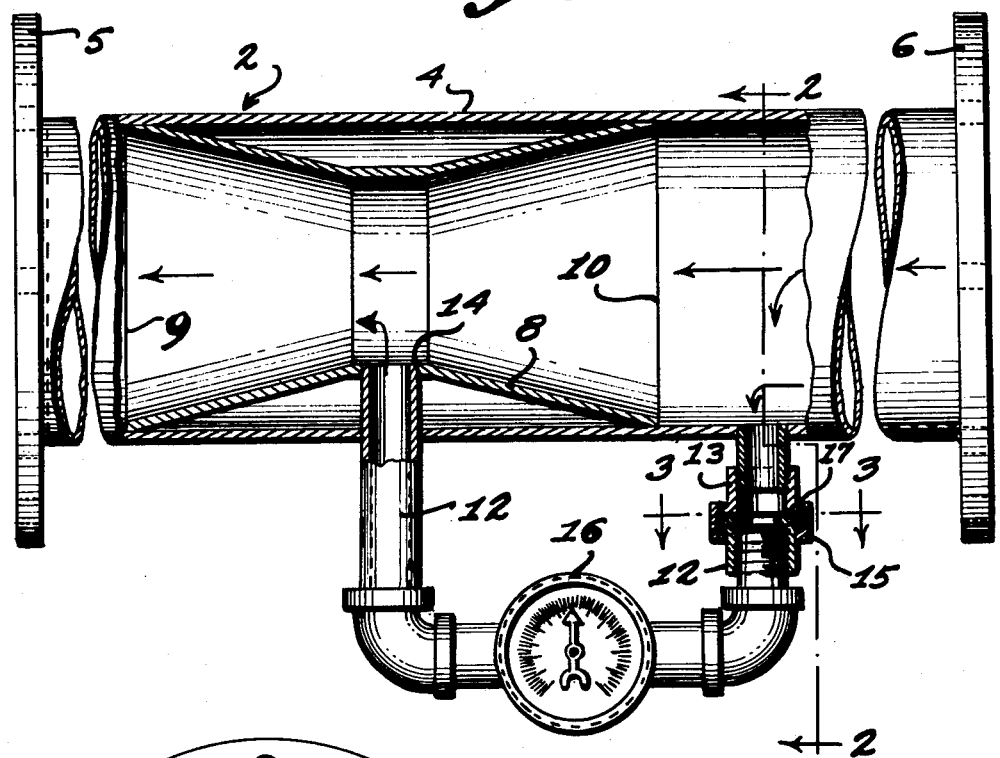
Fig. 1
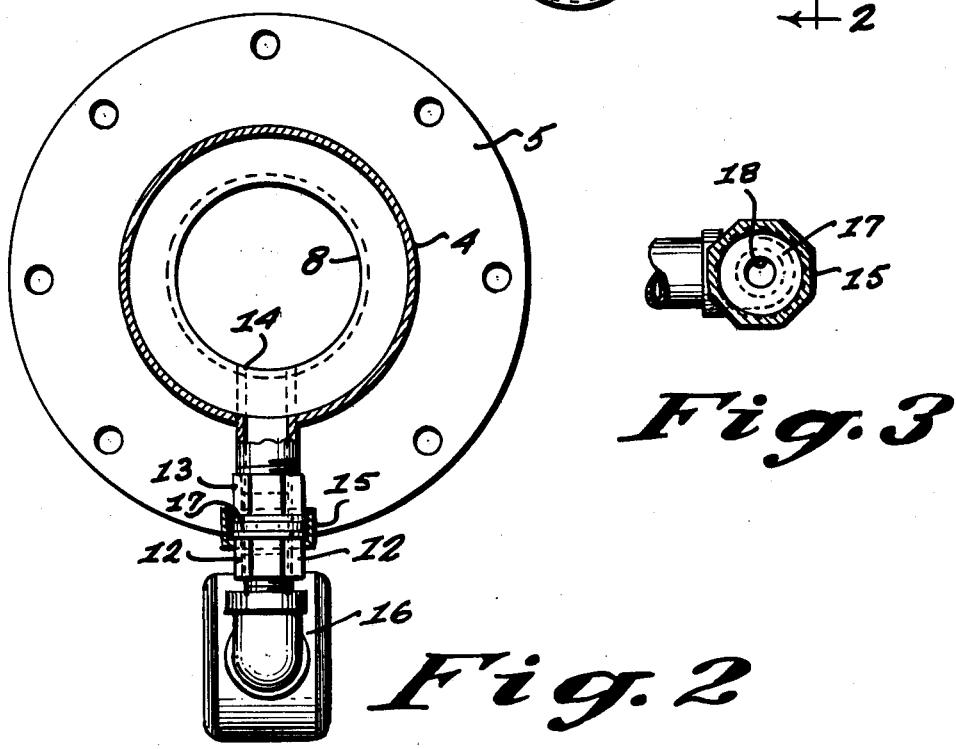
Fig. 2
Fig. 3

VENTURI-TYPE SHUNT FLOWMETER

BACKGROUND OF THE INVENTION

Measurement of water flow rates in large diameter pipes has been the subject of inventive and innovative efforts for some time, particularly in respect to achieving economics in the measurement device, low head loss across the device, and accuracy of measurement. Diverting the flow of some water from the main flow within the primary conduit into a smaller diameter measuring shunt has been disclosed in U.S. Pat. Nos. 793,486, 1,954,386, and 3,314,290 and the references cited therein, in addition to other publications. In spite of the advances made in water flow measurement by these disclosures, the problems of cost and accuracy still persist.

It is therefore an object of the present invention to provide a venturi type of shunt flow meter which is accurate, has low manufacturing cost, and can be easily installed in an existing or new pipe line.

A further object of the invention is to provide means in the by-pass line to enhance the ability of that line to accomodate a fluid flow which will remain porportional to h (where "h" is the pressure differential between the inlet and outlet of the shunt line, created by the venturi), therby stabilizing the ratio throughout the low-to-high flow rate range.

Another object of the invention is to provide means in a shunt flow meter to convert head loss in the shunt loop from a wall-friction controlled system to a fluid-eddy controlled system by introducing a small orifice in the shunt line.

Still another object of the invention is to stabilize the ratio between the main flow and the shunt flow with respect to time in order that the ratio remain constant from low to high flow rates.

Other and further objects, features and advantages of the invention will be apparent from a reading of the following detailed description of the preferred form of the invention taken in connection with the accompanying drawings.

DETAILED DESCRIPTION OF THE INVENTION

In the drawings:

FIG. 1 is a fragmentary side view of the shunt flow meter of the present invention with portions broken away and shown in cross section.

FIG. 2 is a cross sectional view taken along lines 2—2 of FIG. 1.

FIG. 3 is a fragmentary cross section taken along lines 3—3 in FIG. 1.

According to the present invention, the flow meter 2 comprises a section of conduit 4 similar to the pipe into which the flow meter is to be inserted, for example, six- or eight-inch diameter, thin walled irrigation pipe. The conduit section 4 is provided at both of its ends with flanges 5 and 6 for attachment to similar flanges on the ends of the pipe in between which the meter 2 is to be attached.

Longitudinally inside the conduit section 4 is disposed a venturi tube 8 whose flared ends 9 and 10 are welded, or otherwise sealingly engaged, to the inside diameter of the conduit section 4 in order that all water flowing in the conduit section 4 will travel through the venturi tube 8.

A shunt line 12 comprises a small diameter (e.g. 1-inch) conduit forming a "U" shaped diversion course for water flowing from right to left in the main conduit section 4. One end of the shunt line 12 is connected to the conduit section 4 upstream from the flared end 10 of the venturi tube 8 and the other end extends through the conduit section 4 and is connected into the venturi tube at its neck 14.

A mechanical flow meter 16 is disposed in series with the shunt line 12 and can be of any well known type such as turbine, paddle wheel, or propeller.

As water flows through the conduit section 4 and the venturi tube 8, the velocity of the water increases within the venturi tube and the pressure decreases according to Bernoulli's principle. Accordingly, because the pressure at the shunt outlet 14 is less than at the shunt inlet, water will flow from right to left through the shunt 12 and the flow meter 16. Within certain ranges the ratio between the flow rate of water through the shunt line 12 and the flow rate of water in the conduit section 4, is substantially constant, however similar prior art devices have not been able to achieve a measurement accuracy of better than 10% because the ratio is not actually constant especially for wide ranging low rates.

In this invention, it has been discovered that by providing an orifice in the shunt line which has a diameter of approximately half that of the shunt line diameter (ideally a ratio of 1 to 0.578) it is possible to dramatically stabilize the ratio of fluid flow to h through the shunt line, throughout the low-to-high flow range. This stabilization is especially important since the flow in the shunt line goes through entrance holes, pipe beads, jets, paddle wheels and exit holes. One of the reasons for this increased stability is that the small orifice tends to maintain the desired turbulent flow where the head-loss (h) and flow rate relations are proportional to the velocity squared ($v^2$), and thus h. It is undesirable to allow the shunt fluid to become laminar in its flow where the head-loss and flow rate relations are proportional to the fluid velocity to the first power (v).

In the drawings it is seen that the orifice 18 is established with the central bore of an annular plastic or metal washer type of device 17 which is supported and retained by nipples 13 and 14 threaded onto separated portions of the by-pass line 12. The two nipples 13 and 14 are held together by a threaded collar 15 which forms the union.

The result of adding the orifice to the shunt line, as described, is to produce a fluid flow meter capable of measurement accuracies in the range of 1% to 2% as opposed to prior art accuracies of 10%.

I claim:
1. A shunt fluid flow measuring device comprising:
    a section of conduit having a substantially fixed diameter and comprising the primary fluid channel, said section having a reduced diameter tubular portion therein forming a venturi tube;
    means forming a fluid by-pass, having a diameter around a portion of said section of conduit and having an inlet end and an outlet terminal end, said by-pass having the outlet terminal thereof in communication with the interior of said conduit at the said reduced diameter portion thereof;
    means forming an orifice disposed in said fluid by-pass where the diameter of said orifice is approximately one-half the diameter said by-pass,
    fluid flow measuring means serially connected into the fluid by-pass means.
2. The combination of claim 1 wherein the inlet end of the fluid by-pass is interconnected into the conduit section at a point having the fixed diameter of said conduit section.

* * * * *